Oct. 7, 1924.
W. W. MURPHY
1,510,953
TIRE CHAIN TOOL
Filed June 13, 1922   2 Sheets-Sheet 1
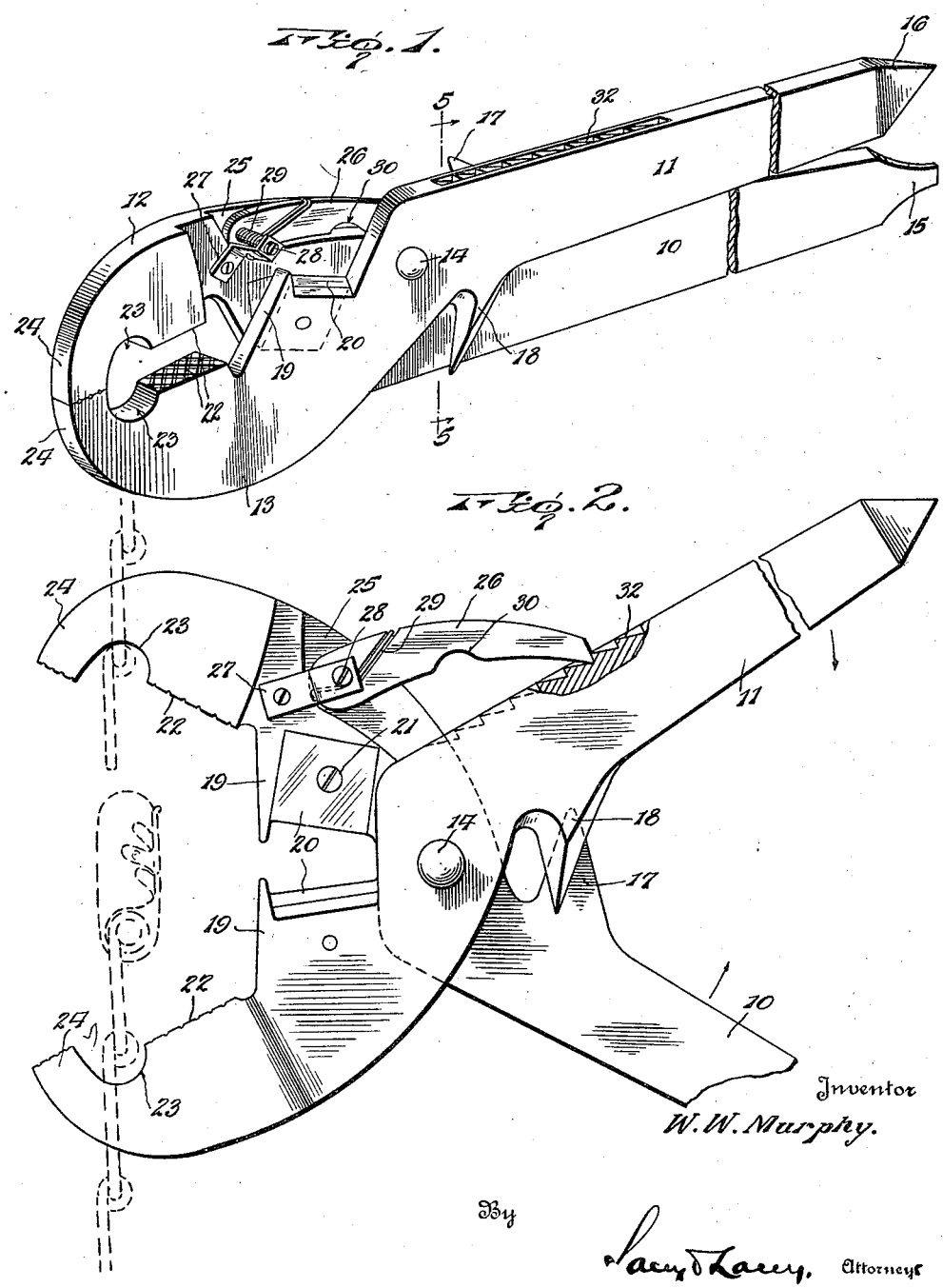

Oct. 7, 1924.
W. W. MURPHY
TIRE CHAIN TOOL
Filed June 13, 1922
1,510,953
2 Sheets-Sheet 2
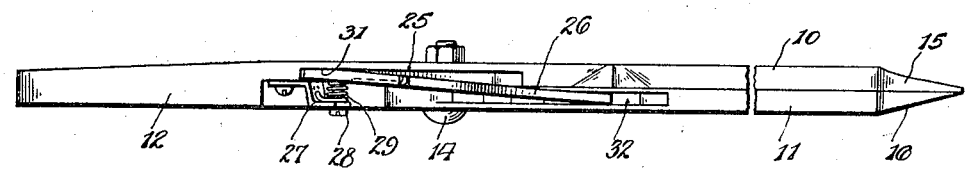
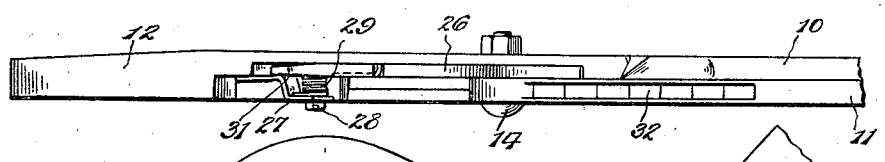
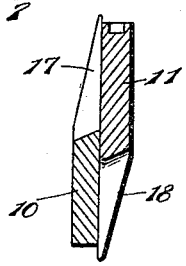
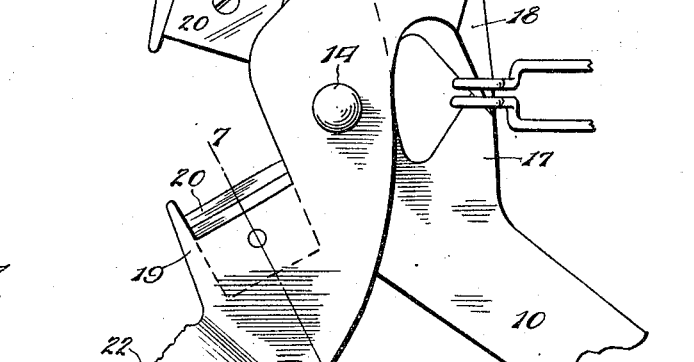
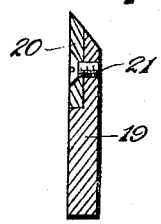
Inventor
W. W. Murphy.
By
Attorneys Patented Oct. 7, 1924.

1,510,953

UNITED STATES PATENT OFFICE.

WILLIAM W. MURPHY, OF BASIN, WYOMING.

TIRE-CHAIN TOOL.

Application filed June 13, 1922. Serial No. 568,042.

*To all whom it may concern:*

Be it known that I, WILLIAM W. MURPHY, a citizen of the United States, residing at Basin, in the county of Big Horn and State of Wyoming, have invented certain new and useful Improvements in Tire-Chain Tools, of which the following is a specification.

This invention relates to an improved tire chain tool and seeks, as one of its principal objects, to provide a device of this character which may be conveniently employed for tightening a chain about a wheel tire and holding the chain taut so that both hands of the operator may be employed for connecting the chain at its ends.

The invention has as a further object to provide a tool which may be employed for opening the terminal links of the cross chains so that said chains may be readily removed, and wherein the tool will also be provided with jaw faces for closing said links so that new cross chains may be readily substituted for the ones removed.

A still further object of the invention is to provide a tool which may be employed for opening the keepers of the fasteners at the ends of a tire chain and may likewise be employed for closing the keepers.

Another object of the invention is to provide a tool which may be employed for cutting the links of a tire chain or for cutting wire, if so desired.

And the invention has as a still further object to provide a tool embodying a screwdriver bit which may be employed for driving screws or prying open the links of a tire chain or for other prying purposes.

Other and incidental objects will appear hereinafter.

Figure 1 is a perspective view of my improved tool;

Fig. 2 is a fragmentary side elevation showing the manner in which the tool is employed for tightening a tire chain about a wheel tire;

Fig. 3 is an edge elevation of the tool when used in the manner shown in Fig. 2;

Fig. 4 is an edge elevation showing the normal position of the locking pawl of the tool;

Fig. 5 is a sectional view on the line 5—5 of Fig. 1, looking in the direction of the arrows;

Fig. 6 is a fragmentary side elevation showing the manner in which the tool is employed for opening the terminal links of the cross chains of a tire chain; and Fig. 7 is a sectional view on the line 7—7 of Fig. 6.

In carrying the invention into effect, I employ pivotally connected levers which, for convenience, have been indicated at 10 and 11 respectively, these levers terminating at their forward ends in coacting jaws 12 and 13, and pivotally connecting he levers is a pivot bolt 14. At its rear end the lever 10 is reduced and tapered to provide a screw-driver bit 15 which may not only be employed for driving screws but may also be employed for prying open the links of a tire chain. Similarly, the lever 11 is provided at its rear end with a tapered pointed terminal 16 which may be readily engaged beneath the free ends of the keepers of the fasteners of a tire chain for opening the keepers. Formed on the lever 10 immediately in the rear of the pivot bolt 14 is a longitudinally tapered spur 17 upstanding from the upper edge of said lever, and formed on the lower edge of the lever 11 is a coacting longitudinally tapered spur 18.

These spurs are provided with flat inner faces to ride over each other while the outer faces of the spurs are beveled at their side edges so that, as shown in Fig. 6, by spreading the levers 10 and 11, the ends of the spurs may be inserted through the loops of any one of the terminal links of the cross chains of a tire chain when, by swinging the levers toward each other or closing the levers, the spurs will act to pry said loops open. Accordingly the tool may be readily employed for removing the cross chains.

Immediately in advance of the pivot bolt 14, the jaws 12 and 13 are widened to provide oppositely beveled blade seats 19; and fitting in said seats, as shown in detail in Fig. 7, are coacting cutting blades 20 detachably secured in position by cap-screws 21, extending through the blades and threaded into said seats. Thus, the tool may be readily used for cutting any of the links of a tire chain, if so desired, or for cutting wire. In advance of the blade seats, the jaws are thickened to provide coating jaw members 22 at the forward ends of which the jaws are formed with recesses 23 defining companion hook-shaped jaw members 24 at the forward terminals of the jaws. As best shown in Fig. 1, the jaws are tapered longitudinally from the rear ends of the jaw members 22 to the forward ends of the jaw members 24, and preferably these latter jaw members are provided with serrated faces so that such jaws may perform the function of plier jaws, the jaw members 24 normally abutting. Furthermore, these jaw members may be engaged with the keeper of a fastener of a tire chain when the levers 10 and 11 may be swung toward each other for closing the keeper. As contrasted with the jaw members 24, the jaw members 22 are normally spaced apart and are particularly designed for use in bending shut the loops of the terminal links of the cross chains of a tire chain, these jaws being preferably provided with milled faces. Thus, as will be perceived in view of the foregoing, the tool may be readily manipulated for removing the cross chains and substituting new chains in lieu thereof.

Formed in the inner end portion of the jaw 12, at its inner side, is a longitudinally directed recess or pawl seat 25 opening through the outer edge of the jaw, and mounted in said seat is a pawl 26 normally lying in the seat flush with the adjacent face of the jaw, the pawl being curved to conform to the curvature of the outer edge of the jaw. Connected at one end to the inner face of the jaw at the forward end of the seat, is a spring bracket 27, and extending through the opposite end of the bracket and through the pawl is a pivot pin or post 28 threaded into the jaw and pivotally supporting the pawl. At its upper edge the pawl is provided with a notch and engaging at one end in said notch is a spring 29 surrounding the post and the opposite end of which is engaged through the bracket. Thus this spring will normally hold the pawl inactive resting within the seat 25, while the bracket 27 will bear over the inner end of the pawl pressing the pawl against the bottom wall of the seat. However, the pawl is provided at its lower edge with a finger notch 30 so that the pawl may be readily swung upwardly and is, as best shown in Figs. 3 and 4, formed at its inner end with a beveled face 31. Accordingly, the pawl may, when raised from its seat, be rocked laterally to rest at its free end against the upper edge of the lever 11; and formed in said edge of this lever is a longitudinally directed rack 32 to coact with the pawl, it being observed that the pawl is pivoted forwardly of the pivot bolt 14 and extends across the plane of said bolt to engage the rack. Furthermore, it is to be noted that when the free end of the pawl is swung upwardly, the bracket 27 will press against the inner end of the pawl for rocking the free end of the pawl laterally and seating the beveled face 31 of the pawl against the bottom wall of the seat 25 so that the free end of the pawl will be held in the plane of the rack. At the same time, the spring 29 will, of course, act to swing the free end of the pawl downwardly in engagement with the rack. Accordingly, after a chain has been arranged about a wheel tire, the levers 10 and 11 may, as best shown in Fig. 2, be swung apart to spread the jaw members 24 so that said jaw members may be engaged through the links of a tire chain near its ends, when the levers may then be swung toward each other for tightening the chain about the tire. As the levers are thus swung toward each other the free end of the pawl 26 will, as will be seen, ride over the rack 32 to coact therewith for locking the jaws of the tool against spreading movement. The tool will thus serve to hold the chain taut so that both hands of the operator may be employed for connecting the ends of the chain. I accordingly provide a particularly efficient tool for the purpose set forth and, as will now be seen, a tool which will meet practically any need of applying, removing, or repairing tire chains.

Having thus described the invention, what is claimed as new is:

1. A tool of the character described including pivotally connected levers having coacting jaws, the jaw of one of said levers being provided with a recess, a spring bracket secured to said jaw, a pawl normally lying in said recess projecting at one end beneath the bracket, a post extending through the bracket and pawl to engage said jaw pivotally supporting the pawl near said end thereof, and a spring surrounding said post pressing the pawl downwardly to lie within said recess, the pawl being provided at said end thereof with a beveled face whereby when the free end of the pawl is swung upwardly the bracket will rock the pawl laterally to engage at its free end with the other of said levers for locking the jaws against spreading movement.

2. A tool of the character described including pivotally connected levers having coacting jaws, the jaw of one of the levers being provided with a recess, and a pawl pivoted near one end upon said jaw and normally lying in said recess, the pawl being moveable to engage at its free end with the other of said levers extending longitudinally of the levers across the pivotal axis thereof for locking the jaws against spreading movement.

In testimony whereof I affix my signature.

WILLIAM W. MURPHY. [L. S.]